T. S. HAMILTON.
WOODWORKING TOOL OR BARREL SAW.
APPLICATION FILED MAR. 17, 1916.
1,234,467.
Patented July 24, 1917.
2 SHEETS—SHEET 1.
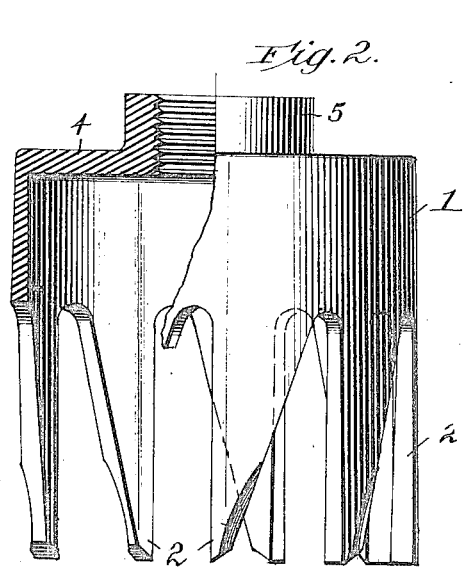
Fig. 2.
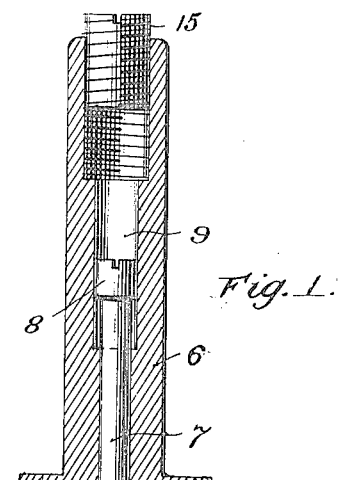
Fig. 1.
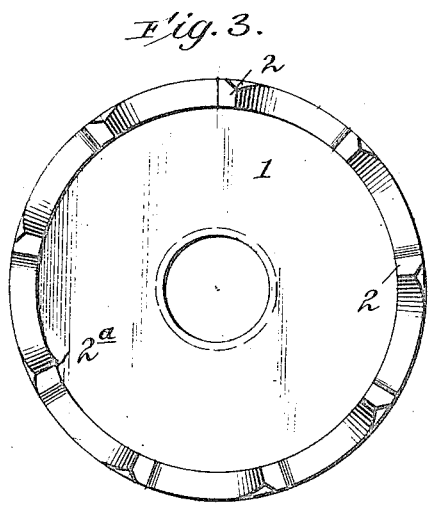
Fig. 3.
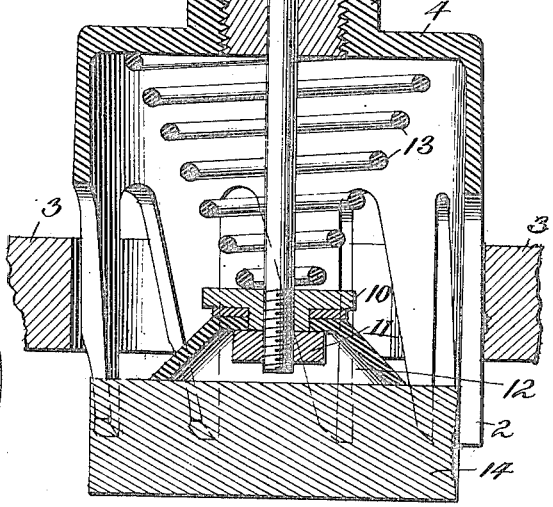
Inventor
Thomas S. Hamilton,
By Dodge and Sons,
Attorneys

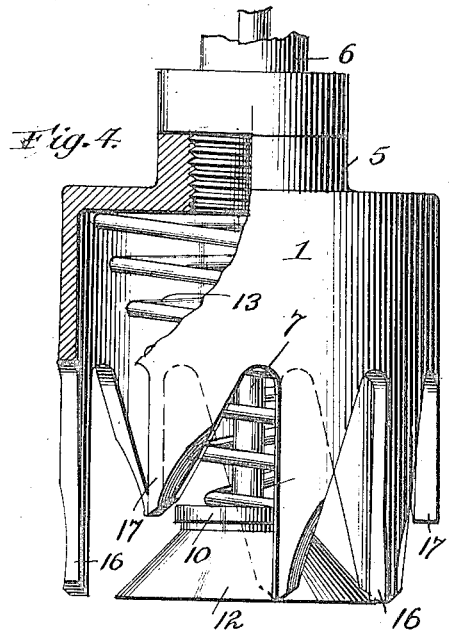
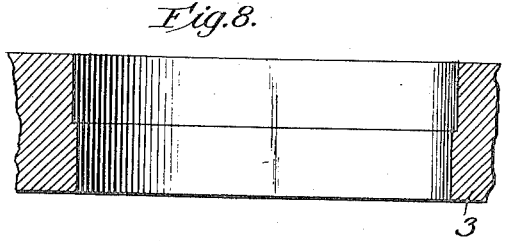
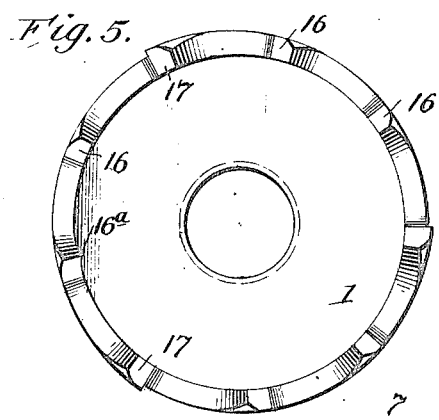
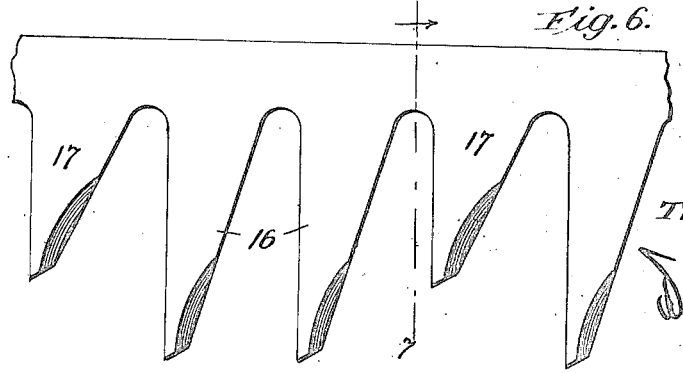

UNITED STATES PATENT OFFICE.

THOMAS S. HAMILTON, OF LOUISVILLE, KENTUCKY, ASSIGNOR TO MENGEL BOX COMPANY, OF LOUISVILLE, KENTUCKY, A CORPORATION OF NEW JERSEY.

WOODWORKING-TOOL OR BARREL-SAW.

1,234,467.   Specification of Letters Patent.   Patented July 24, 1917.

Application filed March 17, 1916. Serial No. 84,864.

*To all whom it may concern:*

Be it known that I, THOMAS S. HAMILTON, a citizen of the United States, residing at Louisville, in the county of Jefferson and State of Kentucky, have invented certain new and useful Improvements in Woodworking-Tools or Barrel-Saws, of which the following is a specification.

My present invention pertains to an improved wood-working tool or barrel saw designed more particularly for forming holes or openings in wood.

Two embodiments of the invention are illustrated in the annexed drawings, wherein:

Figure 1 is a vertical sectional view of the cutter, the same being shown in relation to a piece of timber through which it has just passed, and the ejector being in the act of pushing the severed piece or block from the cutter;

Fig. 2 a sectional elevation of the cutter head or barrel;

Fig. 3 a plan view, as seen from the lower end;

Fig. 4 a sectional elevation of a modified form of cutter, the ejector being shown in part;

Fig. 5 a bottom plan view thereof;

Fig. 6 a templet or projection of the cutter teeth;

Fig. 7 a transverse section on the line 7—7 of Fig. 6; and

Fig. 8 a section of a piece of timber showing the contour of the opening produced by this last form of cutter.

The main object of the present invention is to produce a cutter or barrel saw from which the cut-out block or portion removed from the timber will be automatically ejected.

A further object is to produce a cutter that will produce a cylindrical opening, in the stock, having two diameters.

In the form shown in Figs. 1 to 3 the cutter comprises a body 1 having a series of depending saw-teeth 2, the teeth being arranged in cylindrical form with enough outward set at their points or lower ends to enable them to cut their way through a piece of timber 3, Fig. 1, with a slight clearance for the body of the teeth. As will be seen upon reference to Fig. 3, I preferably set one of the teeth, as for instance, 2ª, inwardly to a slight extent, say, one thirty-second of an inch, and this has the effect of making the plug which is cut out of the stock sufficiently smaller than the interior diameter of the body of the cutter to enable the block to drop out of the cutter or to be forced out without difficulty by the ejector, hereinafter referred to. The head 4 of the cutter is provided with an internally-threaded hub 5, through which, if desired, attachment may be made directly to the spindle of a boring machine. I prefer, however, to employ the construction illustrated in Fig. 1, wherein a spindle or stem 6 is screwed firmly into the hub 5, said stem forming a guide for a rod 7 mounted therein.

The upper end of the rod is provided with a head 8 which works in a recess 9 formed in the stem, while the lower end is threaded and has screwed thereon two nuts 10 and 11 designed to clamp an ejector plate 12 in place. Said plate or member is preferably of the form shown, that is, dished, with its lower edge lying in a plane at right angles to the axis of rod 7, so as to get a firm and even bearing on the stock or timber being cut. A spring 13 is interposed between the upper face of nut 10 and the under face of head 4.

The rod 7 is of such length that when the spring moves the same fully down or until head 8 bottoms in the recess 9, the lower edge of ejector plate 12 will stand in approximate alinement with the lower end of the teeth 2, and as a consequence the cut-out block, designated by 14, will be ejected from the interior of the cutter. It will, of course, be appreciated that as the cutter cuts its way into the stock, plate 12 rests on the stock and as a consequence spring 13 is placed under constantly increasing pressure until the teeth 2 pass through the stock or board 3.

The stem 6 is designed to be secured in the spindle or chuck of a boring machine, and where a plurality of cutters are simultaneously employed, it is desirable to have them all brought to a common plane. Such adjustment is facilitated by the employment of a block or set-screw, as 15, threaded for adjustment in the upper end of stem 6.

Taking the bottom of the socket in the boring machine spindle, in which the stem fits, as a fixed point, one may, by screwing the set-screw in or out, change the relative vertical position or distance of the bit with reference to the stock, assuming, of course, that the head of the screw is thereafter threaded in the socket.

In Figs. 4 to 7 there is illustrated a modification of the cutter, designed to produce a hole in the timber or stock of the form shown in Fig. 8; that is, a bore having two cylindrical sections of different diameters.

The body of the cutter and the ejector or clearer for the cut-out piece are of the same form as those illustrated in the preceding figures. There are, however, two series of teeth, one set, or the longer ones 16, having their outer cutting edges standing at a radial distance from the axis of the cutter slightly less than those of the second or shorter set, 17, see Fig. 7. Preferably, the longer teeth exceed in number the shorter ones, the arrangement in the form shown being two to one, with the longer teeth arranged in pairs.

One of the longer teeth, as 16ª, Fig. 5, is preferably given an inward set of, say, one thirty-second of an inch, in order to cut the block to such diameter that it may readily pass out of the cut.

Having thus described my invention, what I claim is:

1. A barrel saw comprising in combination a cylindrical head having a series of saw teeth extending from its edge, with one at least of said teeth set inwardly from the others; a hollow stem extending upwardly from said head, the bore whereof is shouldered at a point remote from the head; a headed rod mounted in the stem, said shoulder forming a stop for the head of the rod; an ejector plate mounted on the lower end of the rod; and a spring interposed between said plate and the inner wall of the head.

2. A barrel saw comprising in combination a cylindrical head having two series of circularly arranged saw teeth extending outwardly from said cylindrical head, one series being longer than the other and the outer cutting edge of the shorter teeth being more remote from the axis of the cutter than the corresponding edge of the longer teeth, and one at least of said longer teeth being given a set inwardly toward the axis of the cutter to an extent greater than that of the corresponding longer teeth; and a spring - pressed ejector plate mounted within the cylindrical head.

3. A hollow cutter-head, having two series of circularly-arranged saw teeth extending from the same body, one set being longer than the other and arranged a distance from the axis of the cutter-head less than that of the other.

4. A barrel-shaped cutter, having two series of saw teeth extending from the same body one shorter than the other, the outer cutting edge of the shorter teeth being more remote from the axis of the cutter than the corresponding edge of the longer teeth.

5. A hollow cutter-head, having two series of circularly-arranged saw-teeth extending from the same body, one set being longer than the other and arranged at a distance from the axis of the cutter-head less than that of the other, and one at least of said longer teeth being given a set inwardly toward the axis of the cutter to an extent greater than that of the corresponding longer teeth.

In testimony whereof I have signed my name to this specification.

THOMAS S. HAMILTON.